United States Patent
Heng et al.

(10) Patent No.: US 9,249,971 B2
(45) Date of Patent: Feb. 2, 2016

(54) ILLUMINATED ROTARY CONTROL FOR A COMMUNICATION DEVICE

(75) Inventors: Wey Chien Heng, Shah Alam (MY); Shijie Hua, Wilayah Persekutuan (MY); Eng Heng Tan, Padang Serai (MY)

(73) Assignee: Motorola Solutions, Inc., Schaumburg, IL (US)

( * ) Notice: Subject to any disclaimer, the term of this patent is extended or adjusted under 35 U.S.C. 154(b) by 6 days.

(21) Appl. No.: 14/359,980

(22) PCT Filed: Dec. 5, 2011

(86) PCT No.: PCT/MY2011/000239
§ 371 (c)(1),
(2), (4) Date: May 22, 2014

(87) PCT Pub. No.: WO2013/085376
PCT Pub. Date: Jun. 13, 2013

(65) Prior Publication Data
US 2014/0315510 A1    Oct. 23, 2014

(51) Int. Cl.
*H04B 1/08* (2006.01)
*F21V 33/00* (2006.01)
*H01H 19/14* (2006.01)

(52) U.S. Cl.
CPC ............ *F21V 33/0056* (2013.01); *H01H 19/14* (2013.01); *H04B 1/082* (2013.01); *H01H 2219/06* (2013.01); *H01H 2219/0622* (2013.01)

(58) Field of Classification Search
CPC ...................................................... H04B 1/082
USPC .......................................................... 455/347
See application file for complete search history.

(56) References Cited

U.S. PATENT DOCUMENTS

| | | |
|---|---|---|
| 4,221,945 A | 9/1980 | Mobus et al. |
| 5,359,165 A | 10/1994 | Leveque et al. |
| 5,530,576 A | 6/1996 | Jackson et al. |
| 6,438,241 B1 | 8/2002 | Silvfast et al. |
| 6,531,669 B1 | 3/2003 | Miller et al. |
| 6,608,272 B2 | 8/2003 | Garcia |
| 6,624,368 B2 | 9/2003 | Sato et al. |
| 7,244,927 B2 | 7/2007 | Huynh |
| 8,994,758 B2 * | 3/2015 | Linke ........................... 345/690 |
| 2004/0105246 A1 | 6/2004 | Glienicke et al. |
| 2007/0195513 A1 | 8/2007 | Nishiyama et al. |

FOREIGN PATENT DOCUMENTS

| | | |
|---|---|---|
| EP | 1627267 B1 | 6/2007 |
| EP | 1162638 B1 | 1/2012 |
| JP | 2003036760 A | 2/2003 |

OTHER PUBLICATIONS

PCT International Search Report Dated Aug. 31, 2012 for Counterpart Application PCT/MY2011/000239.

* cited by examiner

*Primary Examiner* — Sanh Phu
(74) *Attorney, Agent, or Firm* — Barbara R. Doutre

(57) ABSTRACT

A rotary control (120) is illuminated through a controlled illuminated indicator provided by a light guide arc reflector (114) disposed on a control panel (104) along an outer periphery of a rotary control knob (112). The controlled illuminated indicator concurrently indicates status and location of the rotary control knob. The controlled illuminated indictor generates an increased rotational arc of illumination in response to the knob being rotated in a first direction and generates a decreased rotational arc of illumination in response to the knob rotated in a second direction. The rotary control (120) utilizes a helix slider (304) to control upwards and downwards movement of a reflector shield (302) which block and unblocks light rays in response to the knob (112) being rotated.

19 Claims, 10 Drawing Sheets

ILLUMINATED ROTARY CONTROL FOR A COMMUNICATION DEVICE

This application is a National Stage filing under 35 U.S.C. §371 of co-pending Patent Cooperation Treaty international application having Serial No. PCT/MY2011/000239 (the 'PCT international application') filed on Dec. 5, 2011. This application claims priority to the PCT international application, the entire contents of which are incorporated herein by reference.

FIELD OF THE INVENTION

The present invention relates generally to communication devices and more particularly to an illuminated rotary control for a radio communication device.

BACKGROUND

Communication devices, such as vehicular radios, often include illuminated controls for various radio functions such as volume adjustment, channel change and the like. Designing rotary illuminated controls for the vehicular radio environment is often challenging, as the rotary control can be difficult to fit within a limited form factor of the radio's control panel.

In a dark vehicular environment, a control knob may be insufficiently lit or not lit at all, thus making the control difficult to locate. illumination resolution is typically limited by the number of light sources and thus a light indicator may only show up as a single dot. The use of additional light sources may not be feasible for applications restricted by size and cost. Also, the use of numerous light sources further burdens electrical circuitry and software control.

Additionally, state or level information pertaining to the control, for example volume level, is typically displayed on a separate display which is located elsewhere on the control panel away from the volume control knob. For vehicular applications, drivers typically have to take a quick glance at the separate display to identify the current control state while driving, which can be distracting. Using independent displays in such a manner is also extremely costly.

Accordingly, there is a need for an improved approach to lighting a control for a communication device.

BRIEF DESCRIPTION OF THE FIGURES

The accompanying figures where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
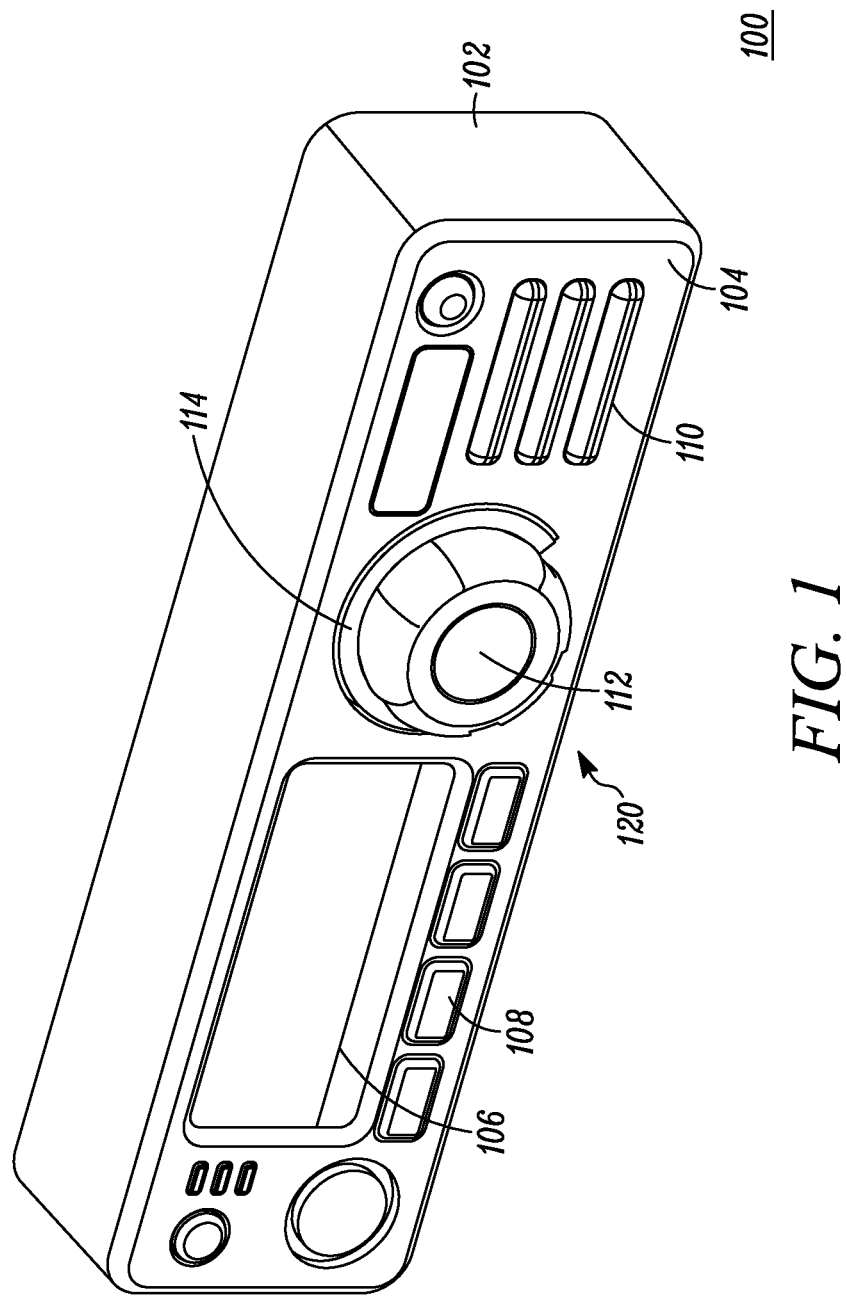
FIG. 1 is a radio communication device operating in accordance with the various embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in apparatus components providing a purely mechanical-based solution to illuminating a control knob, thereby eliminating the cost associated with the software and electrical approaches.

Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

Briefly, there is provided herein a communication device which provides an improved rotary control illumination interface that allows the location of the rotary control to be determined concurrently with the status of the control.

In this document, relational terms such as first and second, top and bottom, and the like may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

FIG. 1 is a radio communication device 100 formed in accordance with the various embodiments. The radio communication device 100 may be a vehicular or mobile radio, portable handheld radio, radio accessory, or the like. Such radio communication devices are typically used in law enforcement, medical rescue operations, public safety environments or the like. These types of radio products are used by personnel that are often managing several tasks at one time and the need for an easy-to-interpret user interface is very important.

Radio communication device 100 is formed of a housing 102 comprising a plurality of functional radio features mounted on a control panel 104. Such functional features may comprise, for example, a display 106, a keypad 108, speaker porting 110, and at least one rotary control 120, such as a volume control knob, channel change knob or other rotary control function. In accordance with the various embodiments, the rotary control 120 is formed and operates to provide an improved illuminated user interface which is easy to interpret even under dark conditions, such as those within a vehicular environment.

Rotary control 120 includes knob 112 and light guide arc reflector 114. The light guide arc reflector 114 is coupled along an outer periphery of the knob 112 on the control panel 104 to provide a continuous arc of illumination without any segmentation. The light guide arc reflector 114 is coupled to the control panel 104 and remains stationary while illumination spreads within the reflector's arc shape in response to rotation of the knob 112.

Figure 2:
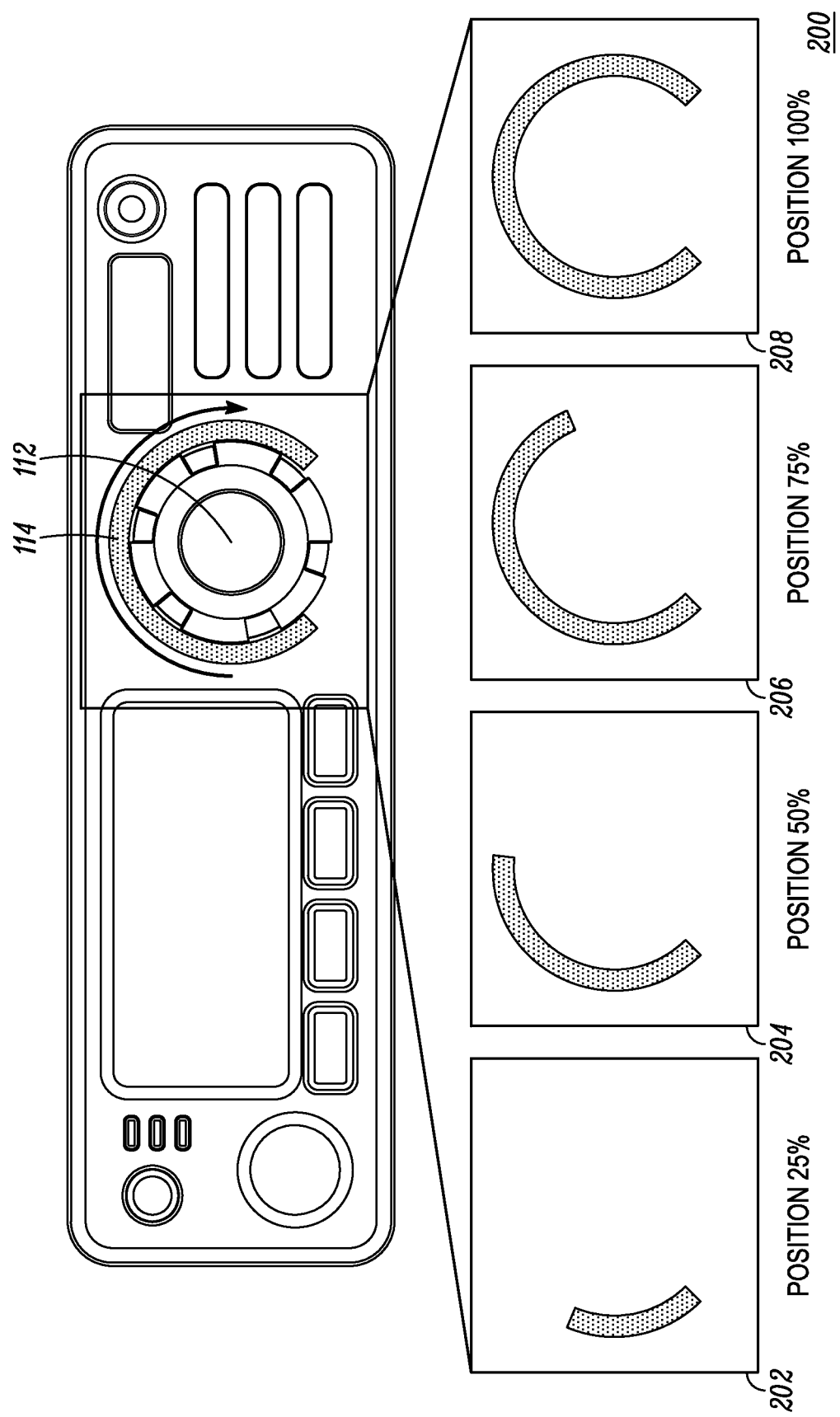
FIG. 2 shows various illumination arcs provided by the light guide arc reflector of FIG. 1 in accordance with the various embodiments.

FIG. 2 shows an example of various illumination arcs 200 provided by the light guide arc reflector 114 of FIG. 1 in accordance with the various embodiments. In response to rotation of knob 112, arc illumination of 25% is shown at 202, arc illumination of 50% is shown at 204, arc illumination of 75% is shown at 206, and arc illumination of 100% is shown at 208. As knob 112 is rotated from a minimum to maximum position, the illumination of the arc follows the rotation of the control knob 112 without delay or lag. Thus, the light guide arc reflector 114 provides an accurate indicator of the current level or state of the control feature. For example, when implemented within a volume control feature, the illumination provided by light guide arc reflector 114 increasingly spreads around knob 112 as the knob is rotated in a first direction to increase volume. The illumination spread decreases as the knob is rotated in a second direction to decrease the volume.

Accordingly, the light guide are reflector 114 provides an accurate indicator of the current volume level of a volume control feature. The knob 112 is rotatable in a continuous motion, and as the knob rotates the arc of light is veiled and unveiled in a corresponding continuous motion. Regardless of the type of control feature, a user is now able to accurately interpret the current level or state of the control knob 112.

Figure 3:
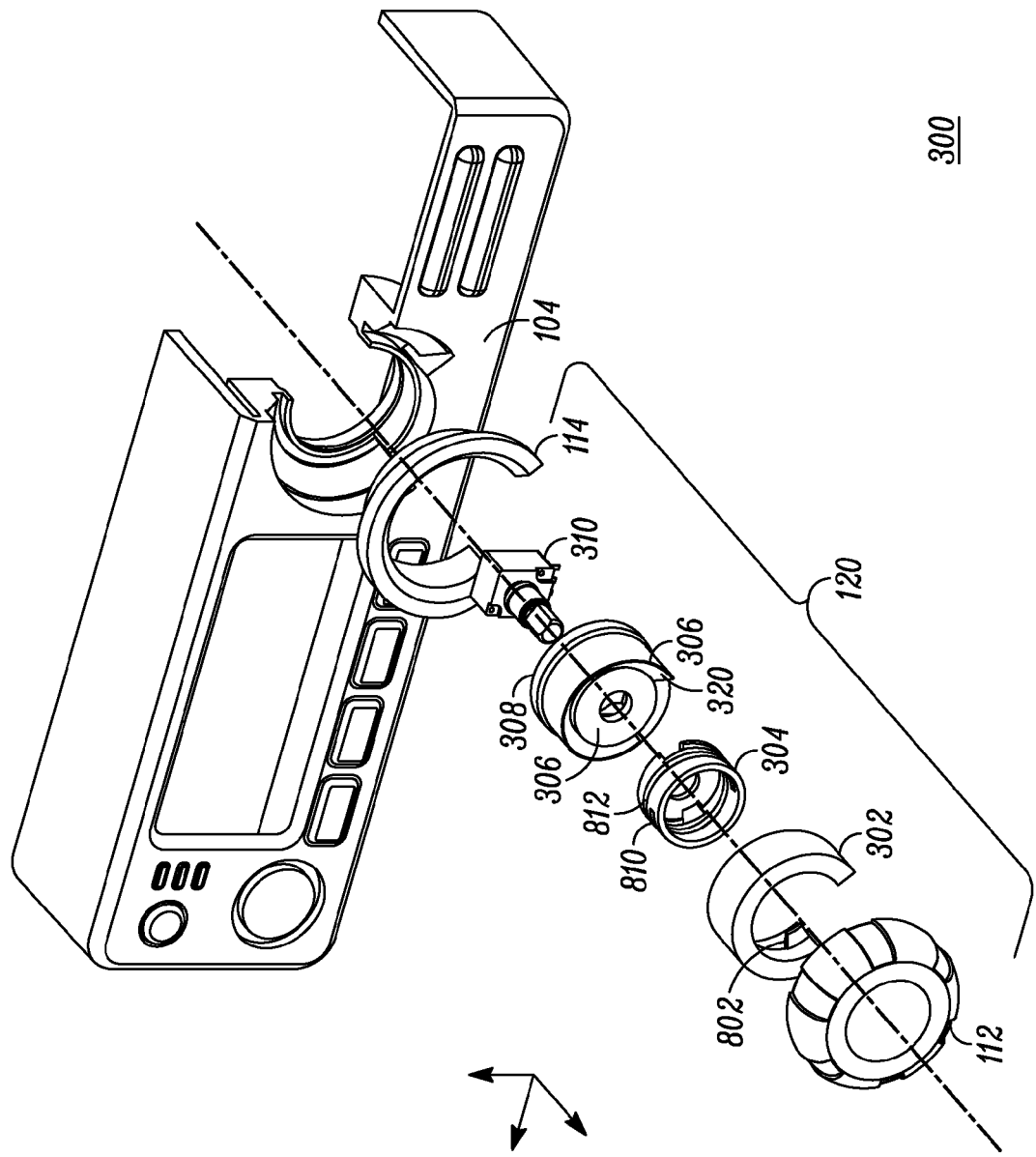
FIG. 3 is an exploded view of the rotary control for the radio communication device of FIG. 1 in accordance with the various embodiments.

FIG. 3 is an exploded view of an assembly for the rotary control 120 for the radio communication device 100 device of FIG. 1 in accordance with the various embodiments. The rotary control assembly 300 comprises knob 112 and light guide arc reflector 114, and a sub-system comprising reflector shield 302, helix slider 304, light guide base 306, seal 308, and switch 310.

The knob 112 and light guide arc reflector 114 are the two components visible from the control panel 104. Knob 112 is formed of a unitarily molded piece part, made of plastic, metal or other suitably rigid material. Knob 112 will be shown in further detail in subsequent views. The light guide arc reflector 114 may be formed of clear plastic or other suitable material through which light can be transmitted.

The reflector shield 302 is formed of a unitarily molded piece part with non-light transmission characteristics, for example an opaque plastic. The reflector shield 302 structure comprises a graduated cylindrical side wall having two tabs 802, 804 (tab 804 is shown in subsequent views) formed on an interior surface of the side wall. The tabs, 802 804 of reflector shield 302 are formed to align within the helix slider 304 to enable rotation of the reflector shield 302 up and down the helix slider in response to rotation of the knob 112.

The helix slider 304 may be formed of a unitarily molded piece part formed of plastic, punched and bended sheet metal or casted material to maintain a predetermined rigidity. The helix slider 304 comprises helical slots 810, 812 formed therein which provide a helical slide for receiving the tabs 802, 804 of reflector shield 302. In accordance with the various embodiments, the reflector shield 302 slides and rotates up and down the helical slide of the helix slider 302 in response to rotation of the knob 112.

The light guide base 306 comprises a prism structure providing a helix sweep prism surface 320 formed thereon. The light guide base 306 is formed clear or light diffusive plastic or other suitable light guide material. The helix sweep prism surface 320 enables internal light reflection, complying with Total Internal Reflection (TIR). Total internal reflection is an optical phenomenon that happens when a ray of light strikes a medium boundary at an angle larger than a particular critical angle with respect to the normal to the surface. If the refractive index is lower on the other side of the boundary and the incident angle is greater than the critical angle, no light can pass through and all of the light is reflected. The critical angle is the angle of incidence above which the total internal reflection occurs.

The seal 308 may be a rubber seal or other suitable type gasket material. The seal will couple the base of the light guide 306 to an interior surface of the control panel 104, as shown in other views.

Figure 4:
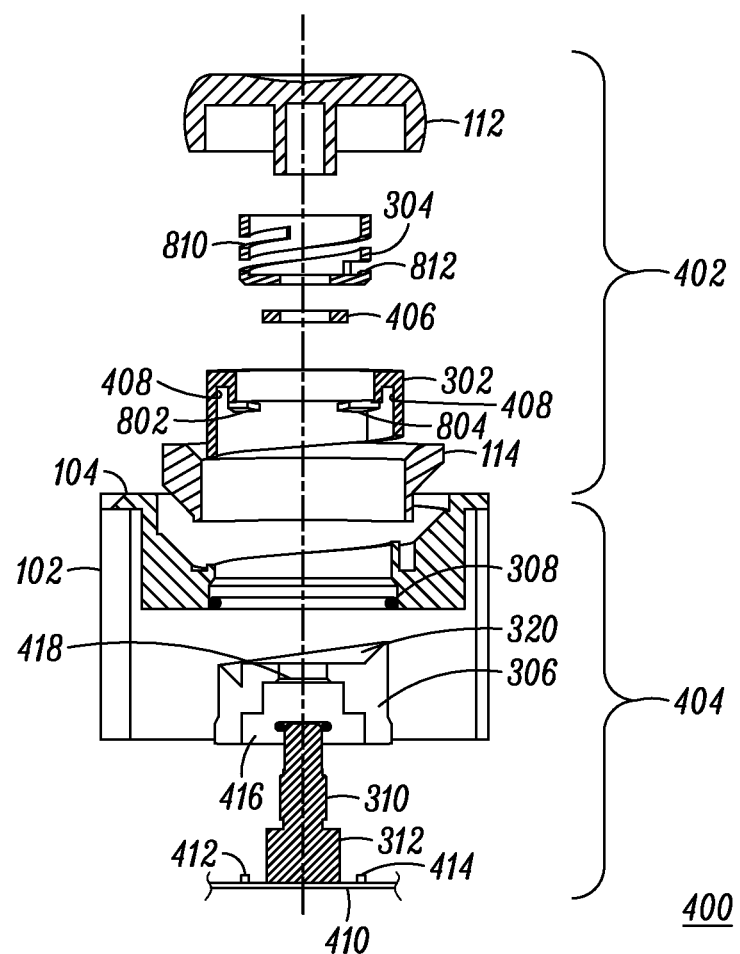
FIG. 4 is a partially exploded cross sectional side view of the rotary control in accordance with the various embodiments.

FIG. 4 is a partially exploded cross sectional side view 400 of the rotary control 120 in accordance with the various embodiments. View 400 is provided to show a stack-up for a top assembly 402 and bottom assembly 404 of the rotary control 120. The top assembly 402 comprises knob 112, helix slider 304, switch nut 406, reflector shield 302, and light guide arc reflector 114. The bottom assembly 404 comprises seal 308, light guide base 306, switch 310, printed circuit board (PCB) 410, and light sources 412. The top assembly 402 is mounted to control panel 104 of housing 102, and the bottom assembly 404 is mounted within the housing 102 behind the control panel 104.

The bottom assembly 404 is structured to assemble from the bottom direction towards control panel 104. The light guide base 306 is structured for assembly from the bottom direction, by means of the radio communication device's 100 main printed circuit board (PCB) 410 towards the housing 102, compressing seal 308 to provide water sealing and retention. The light guide 306 has an interior cavity 416 for receiving the base 312 of switch 310. The light guide 306 further comprises an aperture 418 through which the rotatable portion of the switch 310 will protrude. Thus, the switch 310 is insertable into the light guide base 306. The reflector shield 302 is formed of a graduated cylindrical side wall 408. As will be shown in subsequent views, as the reflector shield 302 is rotated, the graduated cylindrical side wall 408 will shield and un-shield (block/unblock) light reflections from the prism surface 320.

The bottom assembly 404 is preferably mounted towards the control panel 104 via the PCB 410 such that seal 308 compresses to provide the sealing and retention of the light guide 306 to an interior surface of the control panel 104. Alternative mounting means can also be used or incorporated such as adhesives, mechanical bonding, ultrasound welding, screw tightening etc. The bottom assembly 404 thus provides a static platform for receiving the top assembly 402. Light guide base 306 will be shown lit up in subsequent views by a light source. The PCB 410 provides the electrical contact with the switch 310 and light sources 412, 414.

The top assembly 402 may be assembled after the bottom assembly 404 is mounted within the housing 102. The light guide arc reflector 114 may be coupled to housing 102 using mechanical bonding, ultrasound welding, or the like. The reflector shield 302 is insertable into the light guide arc reflector 114, followed by the helix slider 304. The helix slider 304 is mounted to the top of the light guide 306 by using switch nut 406. This will secure the helix slider 304 to the light guide 306. The prism surface 320 of light guide 306 will thus be located along an outer periphery of the bottom of the helix slider 304.

The tabs 802 and 804 of the reflector shield 302 will slide into the corresponding helical slots 810, 812 of the helix slider 304. Other views of the helix slider 304 having two helical slots 810, 812 will be shown later in conjunction with FIG. 8. The reflector shield 302 is able to rotate and travel upwards and downwards about the helical slots 810, 812.

Top assembly 402 is assembled such that the light guide mechanism is hid under the knob 112, and therefore only the light guide arc reflector 114 and knob 112 are visible to a user. The reflector shield 302 unveils glowing light from light guide base 306, allowing light to illuminate the light guide arc reflector 114. Only a predetermined arc area is unveiled to shine while the remainder of the arc remains dark. The reflector shield 302 rotates following knob 112 rotation, unveiling reflected light from the prism surface 320 of light guide 306.

Figure 5:
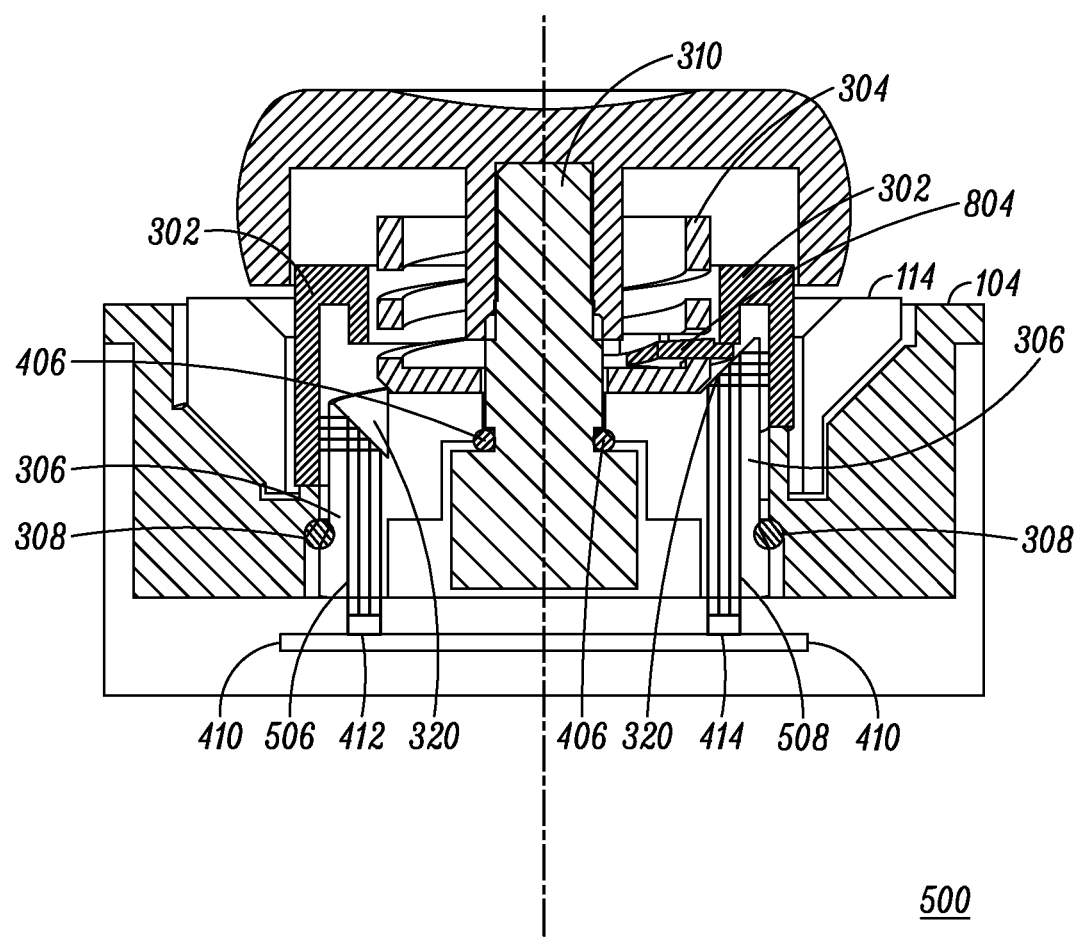
FIG. 5 is a first cross sectional assembled side view of the rotary control rotated such that the arc illumination is blocked in accordance with the various embodiments.

FIG. 5 is a first cross sectional assembled side view 500 of the rotary control 120 rotated such that the arc illumination is blocked in accordance with the various embodiments. View 500 shows the graduated cylindrical side wall 408 of reflector shield 302 (i.e. portion of the wall 408 of reflector shield 302 shown on the left side is longer than the portion of the wall shown on the right side). Light sources 412, 414, may comprise for example, separate LEDs, multiple LEDs, florescent tube(s), OLED, EL, light guide film or other light providing source for light guide 306.

In the illustration of FIG. 5, the first and second light sources 412, 414 shine light rays 506, 508 respectively. When the knob 112 is positioned such that the reflector shield provides a zero (0) percent opening, the light rays 506, 508 from the light source 412 travel to prism surface 320 of light guide base 306 and are reflected sideways but are blocked by the graduated side wall 408 of reflector shield 302, Thus, light only travels within the light guide base 306 and no arc of light is visible when viewed from the control panel 104 of FIG. 1.

Alternatively, depending on the environment within which the radio communication device 100 is being incorporated, it may be desirable to leave the reflector shield 302 slightly offset to allow a small arc of illumination to remain lit at the minimum angle of rotation. The small arc of illumination would facilitate determining the location of the knob 112 even if the rotary control is switched off or at a zero degree rotation setting. The power consumption imposed on a vehicular battery, for example, would be minimal and in some embodiments, if desired, the light sources may be turned off entirely when the radio is turned off.

Figure 6:
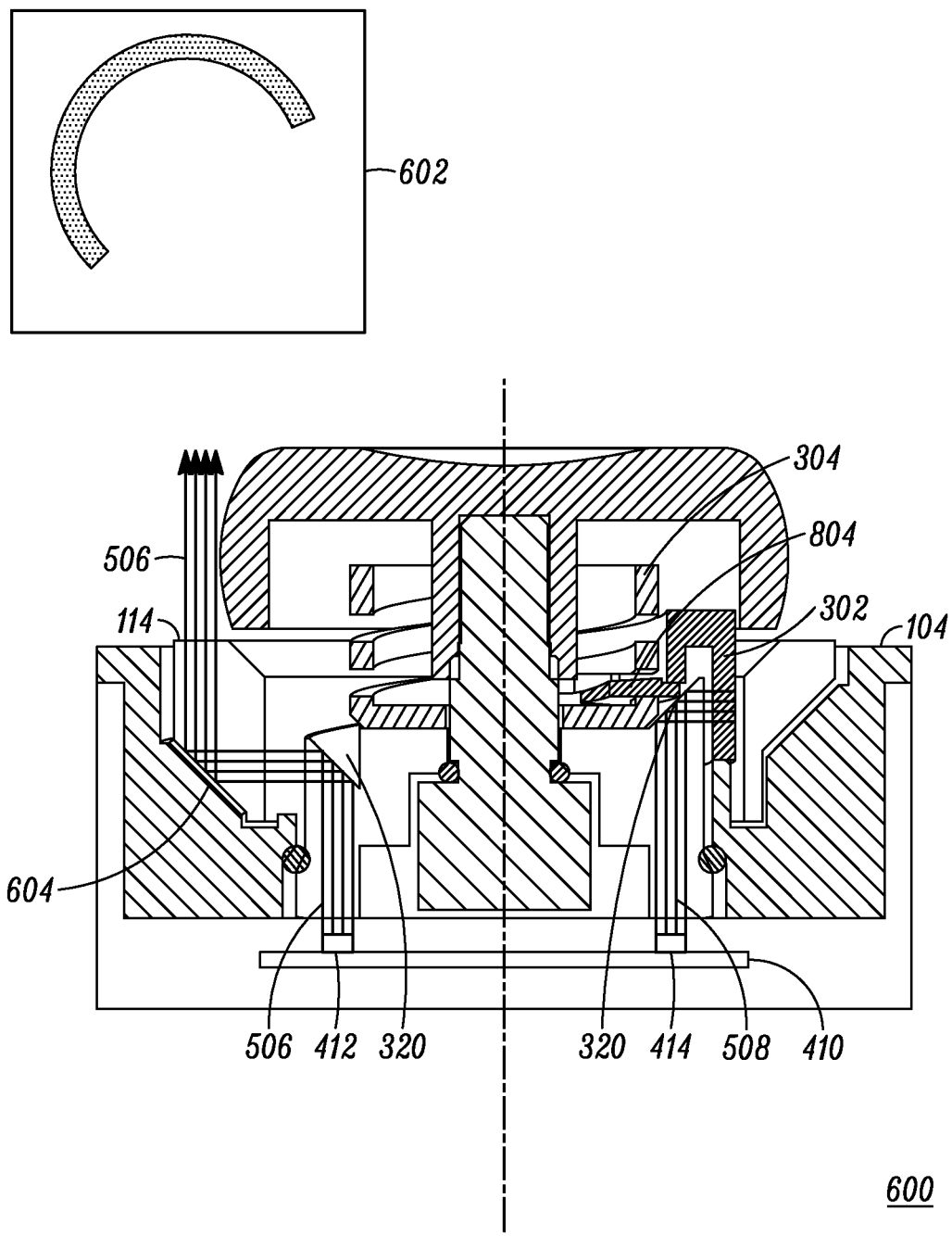
FIG. 6 is a second cross sectional assembled side view of the rotary control rotated such that the arc is illuminated in accordance with the various embodiments.

FIG. 6 is a second cross sectional assembled side view 600 of the rotary control 120 rotated such that the light guide arc reflector 114 is illuminated in accordance with the various embodiments. An active illuminated indicator 602 provides illuminated indicator movement in response to rotation of the knob 112. With the reflector shield 302 rotated to a half opened position, the light rays 506 travel from light source 412 to the prism surface 320 of the light guide base 306. The light rays 506 are reflected to a reflective surface 604 of control panel 104 to provide an appropriate viewing angle upon the light guide arc reflector 114. The light rays 508 travelling from light source 414 are blocked by the reflector shield 302.

Figure 7:
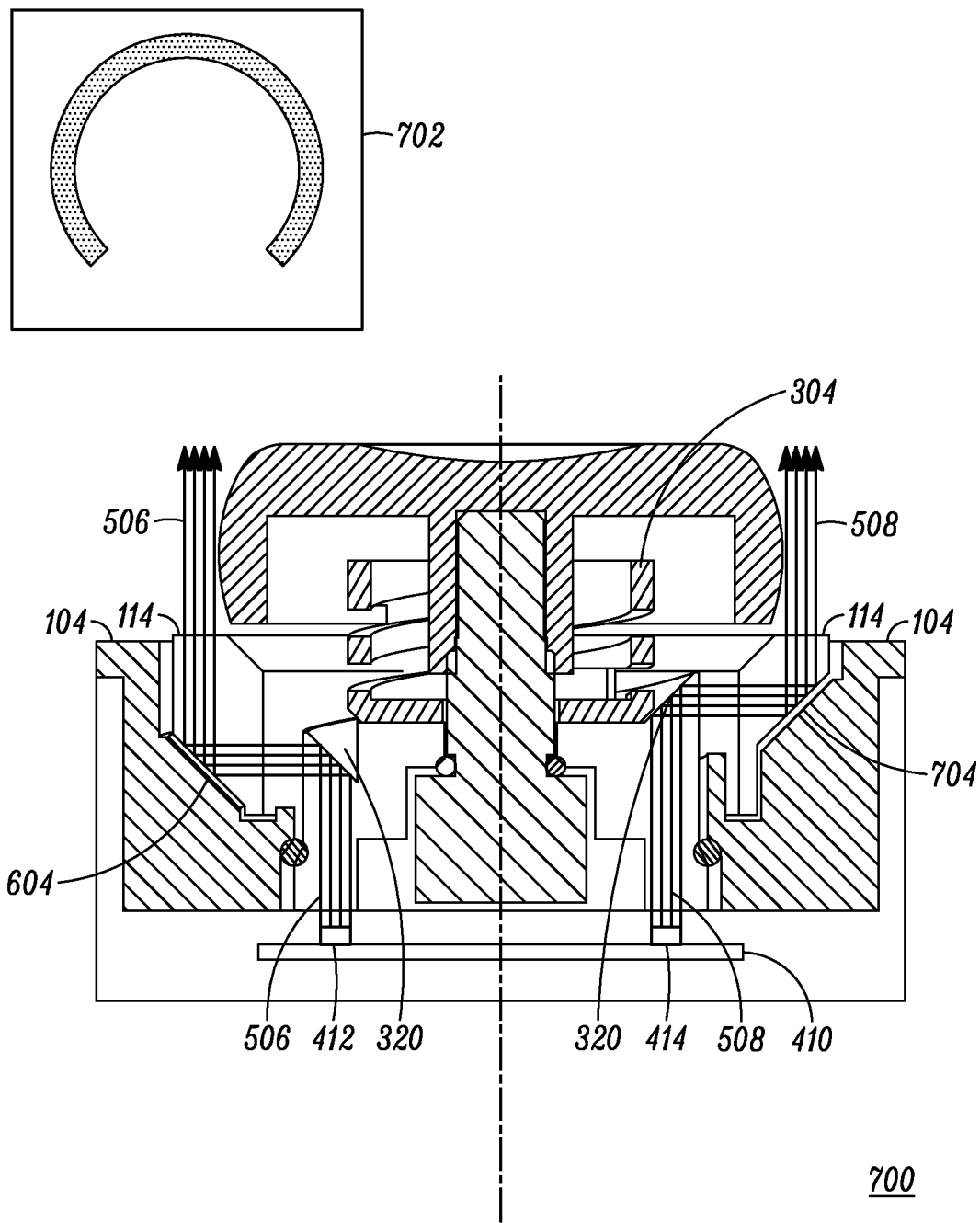
FIG. 7 is a third cross sectional assembled side view of the rotary control rotated such that the arc is illuminated in accordance with the various embodiments.

FIG. 7 is a third cross sectional assembled side view 700 of the rotary control knob 112 rotated such that the light guide arc reflector 114 is illuminated in accordance with the various embodiments. An active illuminated indicator 702 is based on the rotary motion of the knob 112, in the manner previously described. With the reflector shield 302 rotated to a fully opened position, the light rays 506 travel from light source 412 to the prism surface 320 of the light guide base 306. The light rays 506 are reflected to the reflective surface 604 of control panel 104 to provide an appropriate viewing angle upon the light guide arc reflector 114. The light rays 508 travel from light source 414 to the prism surface 320 of the light guide base 306. The light rays 508 are reflected to a reflective surface 704 of control panel 104 to provide an appropriate viewing angle upon the light guide arc reflector 114.

A variety of illuminated indicator embodiments can be achieved using the illuminated rotary control in accordance with the various embodiments. For example, by using multiple color lights, 25% could be green, 50%~75% could be yellow (the $1^{st}$ 25% remain green, such that two color regions can be seen, and during the maximum knob rotation position, the 75%~100% arc section can be red in color, and thus three colors sections can be seen. Depending on the design and user interface requirements, the arc color can be discrete to one color (for example, changing from green to red during the transition from min to max rotation) by using tricolor LED, avoiding any color mixing issues. For example, when the arc is illuminated 25%, the color is green, when the arc is illuminated in the 50%~75% range of rotation, the whole are can be yellow, and for 100% rotation, the whole arc can be red.

Figure 8:
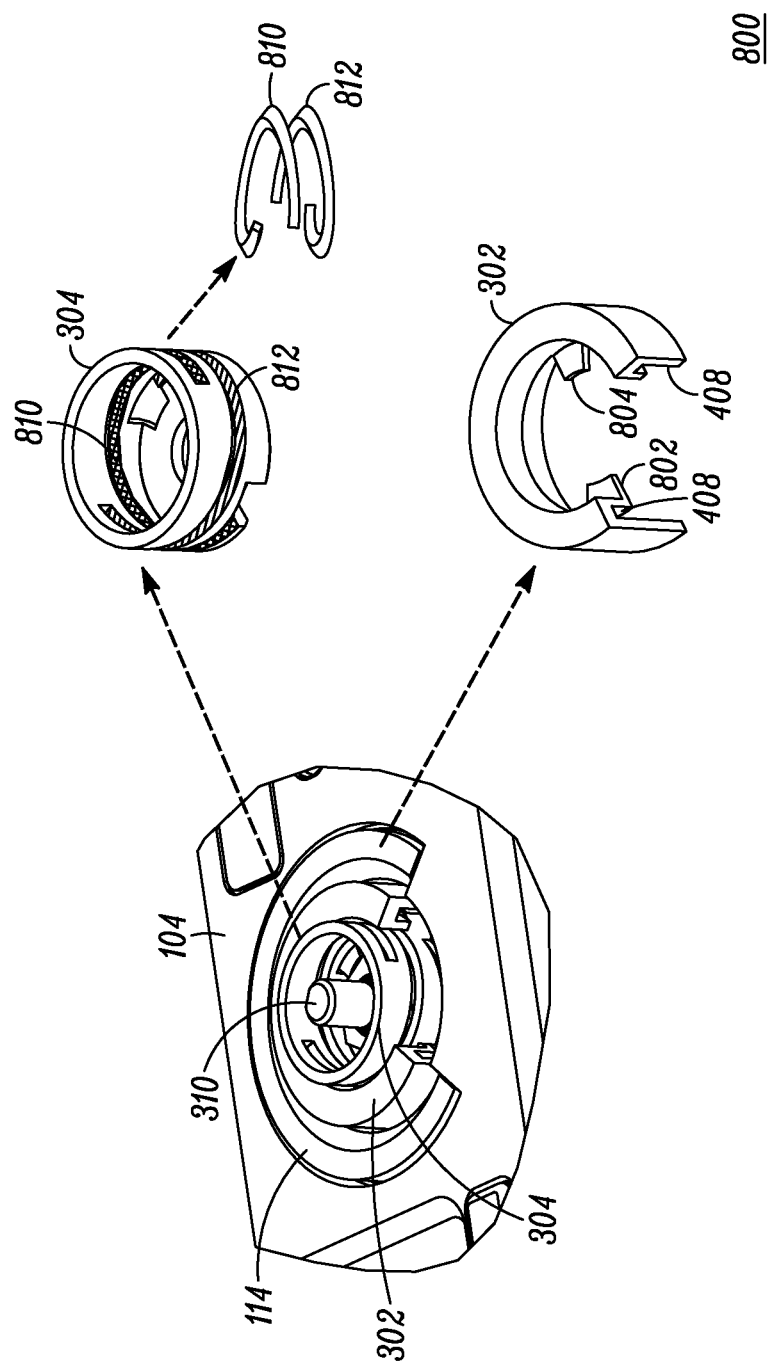
FIG. 8 is a partially assembled view of the rotary control without the knob along with individual piece parts in accordance with the various embodiments.

FIG. 8 is shows a partially assembled view of the rotary control without the knob 112 along with individual piece parts in accordance with the various embodiments. View 800 shows the light guide are reflector 114 coupled to the control panel 104. The reflector shield 302 is mounted within the light guide arc reflector 114. The helix slider 304 is mounted within the reflector shield 302. The switch 310 protrudes through the helix slide 304.

The reflector shield's graduated side wall 408 veils and gradually unveils light as the shield is rotated. The cylindrical shaping has an opening within the side wall 408 which allows for complete unveiling of light.

The helix slider 304 comprises helical slots 810, 812 formed therein. The helical slots 810, 812 of helix slider 304 provide a helical slide upon which the reflector shield 302 rotates. The first and second tabs 802, 804 of reflector shield 302 protrude from an interior surface of the reflector shield 302 into their respective helical slots 810, 812. Tabs 802, 804 of reflector shield 302 align within the helical slots 810, 812 of helix slider 304. Thus, the reflector shield 302 is able to rotate within the slots so as to slide up and down the helix slider 304 in response to the rotation of the knob 112. The reflector shield 302 may be raised and lowered in accordance with the pitch of the helix slider 304.

The advantage of having more than one slot is to provide a balanced and coupled constraint for the reflector shield 302. The use of a single slot would cause the rotation and movement of tabs 802 or 804 to me misguided causing the reflector shield to tilt to one side. Having two helical slots 810, 812 in the helix slider 304 provides steady rotation and smooth movement of the reflector shield 302 while sliding within the helical slots 810, 812. The use of two helical slots 810, 812 ensures proper guidance and alignment of the reflector shield 302 along the axis of rotation.

Figure 9B:
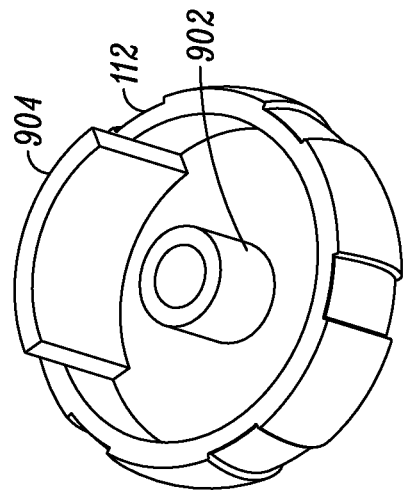
FIG. 9B shows a back perspective view of a knob for the rotary control formed in accordance with the various embodiments.
Figure 9A:
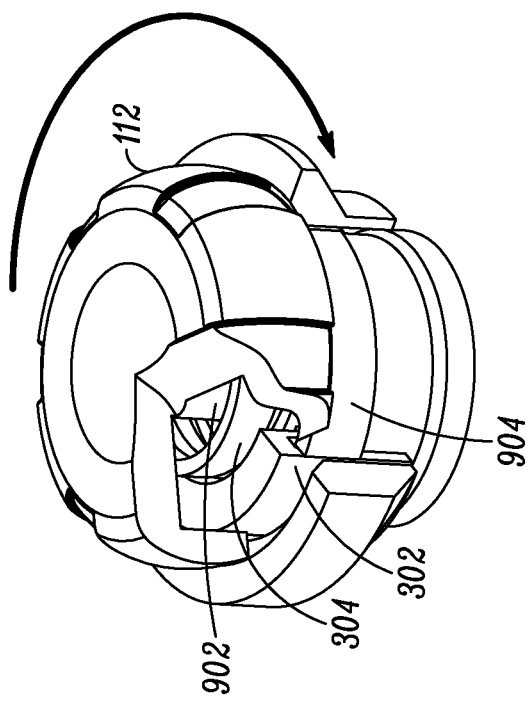
FIG. 9A is cut-away view of the rotary control in accordance with the various embodiments.

FIG. 9A is cut-away view of the rotary control in accordance with the various embodiments. FIG. 9B shows a back perspective view of the knob 112 for the rotary control formed in accordance with the various embodiments. Knob 112 is formed of a unitarily molded piece part comprising a center core 902 for mounting to the rotating potion of switch 310. The knob 112 also comprises an interior wall 904. As knob 112 is rotated, the interior wall 904 of the knob 112 pushes the reflector shield 302. Thus, the reflector shield 302 is synchronized to the rotation of the knob 112. In response to being pushed, the reflector shield 302 slides/rotates along the helical slide provided by helix slider 304 to veil and unveil illumination generated by the light guide 306 and reflected via prism surface 320.

Figure 10A:
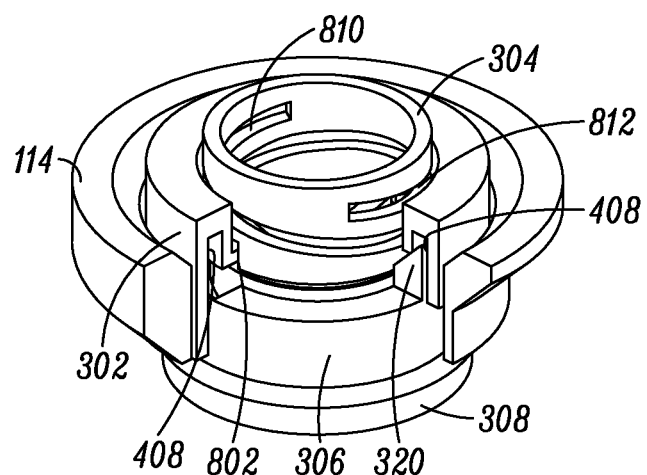
FIG. 10A shows a partially assembled view of the rotary control without the knob in accordance with the various embodiments

FIG. 10A shows a partially assembled view of the rotary control 120 without the knob 112 in accordance with the various embodiments this view shows the previously described reflector shield 302 aligned within the helical slots 810, 812 of helix slider 304. The tab 802 can be seen protruding from the interior surface of the reflector shield 302 into helical slot 812 of helix slider 304. Tabs 802, 804 are formed on the interior surface so as to slide within the helical slots 810, 812 of helix slider 304. Thus, the reflector shield is able to rotate and slide up and down the helix slider 304 in response to the rotation of the knob 112 (not shown in this view). The reflector shield 302 includes the graduated cylindrical side wall 408 and, depending on the angle of rotation of the reflector shield, the prism surface 320 of light guide 306 may be inserted into the graduated cylindrical side wall 408 to block light reflections from prism surface 320. The reflector shield 302 and the control knob 112 are the only elements that rotate within the assembly. All other elements, including the light guide 306 with prism sweep 320, and the helix slider 304 are stacked in a stationary manner. The reflector shield 302 slides up and down the helical slider 304 along the helical slots 810, 812 in response to knob rotation such that the reflector shield 302 veils and unveils light from the light guide's prism surface 320 in a controlled manner.

Figure 10B:
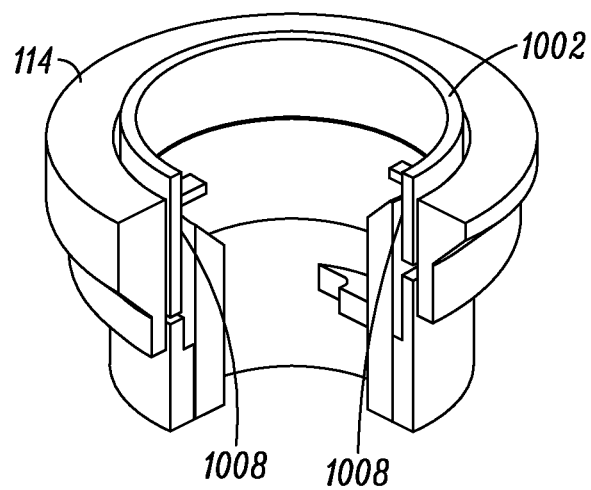
FIG. 10B is a simplified alternative model of a reflector shield mounted within the light guide arc reflector in accordance with the various embodiment.

FIG. 10B is a simplified model of a reflector shield 1002 mounted within the light guide arc reflector 114 in accordance with another embodiment. Like the previously described reflector shield 302, the reflector shield 1002 comprises a graduated cylindrical side wall 408 with first and second tabs formed on an interior surface of the wall for aligning within the helical slots 810, 812 of helix slider 304 (shown in previous views). As the knob 112 (shown in previous views) is rotated, the reflector shield 1002 slides along the helical slots 810, 812 thereby raising the reflector shield 1002 by the pitch of the helical slider 304. The rotation of the graduated cylindrical side wall 408 is used to block and unblock light as previously described.

Accordingly, there has been provided an improved illumination interface for a rotary control. The use of the mechanical based system minimizes the need for any additional software or electronics. The rotary control location and status level are concurrently provided by the same indicator. The use of an active backlit indicator ring allows a user to effectively determine the status level of the control with a single glance without having to read a display. The improved illumination interface is particularly beneficial for communication devices utilized in the public safety arena, such as in the mobile or vehicular two-way radio environment.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A rotary control interface for a communication device, comprising:
   a light source for generating light rays;
   a light guide for reflecting light rays;
   a reflector shield for controlling shielding and unshielding of the reflected light rays;
   a helix slider coupled to the light guide, the helix slider having a helical slide within which to rotate the reflector shield;
   a knob for rotating the reflector shield along the helix slider while concurrently controlling a feature of the communication device; and
   a light guide arc reflector providing an illuminated indicator of the location of the knob and a current status level of the feature in response to rotation of the knob.

2. The rotary control interface of claim 1, wherein the light guide comprises a prism surface.

3. The rotary control interface of claim 1, wherein the knob comprises an interior wall for rotating the reflector shield.

4. The rotary control interface of claim 1, wherein the light guide arc reflector spreads an arc shape of illumination about a periphery of the knob in response to the knob's angle of rotation from a minimum to maximum position.

5. The rotary control interface of claim 4, wherein the illuminated indicator provides a continuous arc of light without any segmentation.

6. A communication device, comprising:
   a housing;
   a rotary control coupled to the housing, the rotary control comprising:
     a knob;
     an illumination indicator disposed on the housing along an outer periphery of the knob, the illumination indicator providing an arc of illumination synchronized with rotation of the knob;
     a light guide generating light rays to illuminate the illumination indicator;
     a reflector shield for shielding the light rays from the light guide in response to the knob being rotated in a first direction and for unshielding the light rays from the light guide in response to the knob being rotated in a second direction; and
     a helix slider coupled to light guide, the helix slider providing a helical slide upon which the reflector shield rotates upwards and downwards in response to rotation of the knob in the first and second directions.

7. The communication device of claim 6, wherein the light guide becomes unshielded in a graduated manner as the knob travels from a minimum angle of rotation to a maximum angle of rotation.

8. The communication device of claim 6, wherein the helical slide of the helix slider is formed of first and second helical slots.

9. The communication device of claim 7, wherein the reflector shield is formed of a graduated cylindrical side wall with first and second tabs formed on an interior surface of the graduated cylindrical side wall, the first and second tabs aligning within the first and second helical slots of the helix slider to enable rotation of the reflector shield upwards and downwards in response to rotation of the knob in the first and second directions.

10. The communication device of claim 9, further comprising:
   a prism surface formed along a periphery of the light guide for reflecting the light rays;
   an internal peripheral cavity formed within the reflector shield; and
   the graduated cylindrical wall blocking and unblocking light reflections from the prism surface in response to the knob rotating the reflector shield along the helix slider.

11. The communication device of claim 6, wherein the illumination indicator provides a representation of the current state of a function of the rotary control.

12. The communication device of claim 6, wherein the illumination indicator passes light rays without any segmentation.

13. The communication device of claim 6, wherein to rotary control comprises a volume control.

14. The communication device of claim 6, further comprising:
   a seal coupled between a base of the light guide and the housing.

15. The communication device of claim 6, wherein the communication device comprises a vehicular radio.

16. A radio, comprising:
   a housing having a control panel upon which is located a plurality of controls, at least one of the controls being a rotary control knob;
   a controlled illuminated indicator disposed on the control panel along an outer periphery of the rotary control knob, the controlled illuminated indicator concurrently indicating volume status and location of the rotary control knob, the controlled illuminated indictor generating an increased rotational arc of illumination in response to the knob being rotated in a first direction and providing a decreased rotational arc of illumination in response to the knob rotated in a second direction, wherein the rotational arc of illumination is controlled via a control mechanism comprising:
      a light guide for reflecting light rays;
      a helix slider coupled to light guide, the helix slider having first and second helical slots; and
      a reflector shield mounted to the helix slider, the reflector shield moving upwards and downwards along the helical slots to shield and unshield the reflected light rays in response to the knob being rotated.

17. The radio of claim 16, wherein the radio is mounted within a vehicle.

18. The radio of claim 17, wherein the rotary control knob provides a volume control function.

19. The radio of claim 16, wherein the rotational arc of illumination is a non-segmented rotational arc of illumination.

* * * * *